United States Patent Office 3,556,765
Patented Jan. 19, 1971

3,556,765
LIQUID SOLUBLE PACKET
Walter A. Houston, Park Ridge, Ill., assignor to Encap Products Company, Park Ridge, Ill., a corporation of Illinois
No Drawing. Filed Aug. 8, 1967, Ser. No. 659,030
Int. Cl. A01n 9/24
U.S. Cl. 71—117                                    1 Claim

ABSTRACT OF THE DISCLOSURE

The invention concerns a water soluble pesticide packet for submersion into water to form a liquid pesticide spray. Upon submersion, the polyvinyl-alcohol film encapsulating the pesticide powder dissolves exposing the soluble pesticide powder and the inert dissolving agent therein. To promote rapid solution of the soluble pesticide powder in the liquid, a relatively high concentration of inert soluble material such as sucrose is mixed with the pesticide powder. The weight of the dissolving agent constitutes approximately 40% to 60% of the total weight of the soluble mixture encapsulated within the packet.

---

This invention generally relates to a liquid soluble pesticide packet and more particularly relates to a liquid soluble pesticide packet having improved solubility characteristics so that upon immersion of the packet into a suitable liquid, the pesticide powder encapsulated therein will be taken into solution in a relatively rapid and even manner without the necessity of slurry preparation of excessive agitation.

Various types of single portion packaged products are readily available to the consumer public. Premeasured amounts of soap, detergents, dry bleaches, etc., are marketed in individual packets each of which contains sufficient ingredients for a single application or use. Many of the products so vended are somewhat toxic in that they contain substances which could be harmful or irritating should they be placed in intimate contact with the skin of the user. To provide a safe, more convenient package, such substances are often encapsulated in relatively small fin-type pouches constructed of water soluble polyvinyl-alcohol film. The user need not open the package, but merely immerse the capsule into water, thus dissolving the film and thereby releasing the contents so as to allow the ingredients to form a solution with the water.

A particular area in which such portion packaging is advantageous is in the marketing of powdered pesticide spray compounds. Pesticide products are considered to include insecticides, fungicides, miticides, herbicides, etc. Pesticide powders which include active as well as inert ingredients are abundantly used in the agricultural industry. They are mixed with water to form a solution which is then sprayed upon the vegetations to obtain the desired results. The user of such agricultural products immerses the powdered mixture into a small quantity of water to form a slurry. Additional water is added and the liquid agitated to produce a uniform solution.

Such preparations are designed and formulated for the agricultural industry and are generally unsatisfactory for use by the domestic gardener. Agricultural formulations are designed to meet the needs of farm sprayers which usually depend upon mechanical or bypass agitators for initial slurry and solution preparation. The use of such agricultural formulations by the domestic gardener requires slurry preparation and considerable agitation of the spray tank. This is an inconvenient procedure which is generally ignored. This omission frequently results in poor break-up of the compacted pesticide powder and a nonuniform solution. The sprayed vegetation may thus become burned through excessive toxicant exposure or unsatisfactory results may be obtained by inadequate treatment. Occasionally, especially toward the end of the spraying process, the spray nozzle may become clogged as a result of high toxicant concentration.

The aforementioned difficulties are particularly apparent when agricultural formulations are supplied to the domestic gardener in premeasured, single portion, water soluble packets. When such pesticide packets are dropped into the spray tank, they do not readily go into solution without the added step of either preparing an initial slurry or stirring the liquid excessively. Rather, the pesticide powder remains compacted at the bottom of the tank with the inner core thereof frequently remaining dry. The preparatory operations necessary to obtain a uniform solution are generally ignored by the domestic user, resulting in a poor and often damaging spray concentration.

A main object of the present invention is to provide an improved liquid soluble pesticide packet suitable for use in the preparation of pesticide sprays. A further object is to provide a pesticide powder which will go into solution in a liquid without the necessity of inconvenient preparatory steps. A still further object is to provide a liquid soluble pesticide packet having greatly improved qualities so as to provide a more uniform solution of toxicants within a liquid over a considerable period of time. Other objects and advantages of the invention will become apparent through reference to the following discussion which describes an illustratve embodiment of this invention.

A preferred embodiment of a liquid soluble pesticide packet including certain features of this invention comprises a conventional fin-type pouch constructed of polyvinyl-alcohol film approximately 1.5 mm. in thickness. The cavity defined by the pouch is approximately 2½ cubic inches in volume. A particular characteristic of the aforementioned film material is that it is water soluble. Upon immersion of the packet into water, the film dissolves so as to expose the powdered pesticide compound therein. As previously mentioned, such polyvinyl-alcohol film pouches are relatively well-known in the art and are presently used for portion packaging of bleach, dyes, and other similar consumer products.

Disposed within the cavity defined by the packet is a quantity of water soluble pesticide powder. The term soluble pesticide powder is considered to include not only active soluble ingredients, but also inert carriers which are also soluble. These soluble pesticide powders are preferably completely dissolved in the liquid before spraying. The present invention may be used with various soluble pesticide powders such as insecticides, herbicides, miticides, fungicides, etc., which are known in the trade. Serving to facilitate the solution of the soluble pesticide powder in the liquid is a soluble inert dissolving agent which displays the particular property of having a relatively negligible effect on the pH of the final pesticide solution and, further, does not produce a film about the soluble pesticide powder so as to inhibit solution thereof. Further, the inert material must not adversely influence the solubility of the film forming its pouch. A particular dissolving agent which has been found satisfactory in this regard is sucrose ($C_{12}H_{22}O_{11}$). It has been found that the pesticide powder most readily enters into solution without the necessity of excessive agitation when the dissolving agent comprises between 40% to 60% of the total weight of the soluble ingredients within the pesticide packet.

A particular pesticide packet for weed spray was constructed in accordance with the foregoing description. The mixture comprised 47% by weight of lithium 2,4-dichlorophenoxyacetate and 53% by weight of sucrose. Thirty-two grams of the above mixture were sealed in a pouch of polyvinyl-alcohol film. The pouch was immersed into a gallon of tepid water, and the pesticide powder rapidly went into solution with a minimum of agitation and mixing, providing a very effective weed spray.

Although but one specific embodiment and a single example have been described, other alterations and variations will be obvious to those skilled in the art without departing from the scope and spirit of this invention.

What is claimed is:

1. A method of making a single-portion pesticide packet comprising the steps of, forming a packet of relatively thin liquid-soluble film having a sealed pouch defining a cavity therein, depositing a predetermined quantity of soluble pesticide powders comprised of lithium-2,4-dichlorophenyloxyacetate in the cavity defined by said pouch, adding sucrose to said pesticide powders in said cavity in an amount greater than 40% of the weight of the soluble ingredients in said pouch, said sucrose serving as a dissolving agent whereby upon immersion of said pouch into a liquid, the contents therein will be readily dissolved into the liquid without the necessity of slurry preparation or excessive agitation.

References Cited

UNITED STATES PATENTS

| | | | |
|---|---|---|---|
| 2,750,027 | 6/1956 | Cummings | 206—.5 |
| 3,186,869 | 6/1965 | Friedman | 206—.5 |

FOREIGN PATENTS 662,006  10/1965  Belgium.

OTHER REFERENCES

Frear: Chemistry of Insecticides, Fungicides and Herbicides, 2nd ed., p. 254 (1948).

JAMES O. THOMAS, JR., Primary Examiner

U.S. Cl. X.R.

71—65